United States Patent [19]

Echigo et al.

[11] Patent Number: 4,576,969
[45] Date of Patent: Mar. 18, 1986

[54] SPHERICAL ION EXCHANGE RESIN HAVING MATRIX-BOUND METAL HYDROXIDE, METHOD FOR PRODUCING THE SAME AND METHOD FOR ADSORPTION TREATMENT USING THE SAME

[75] Inventors: Yoshiaki Echigo; Yoshiyuki Suematsu; Tadashi Ishikura, all of Kyoto, Japan

[73] Assignee: Unitika Ltd., Hyogo, Japan

[21] Appl. No.: 541,646

[22] Filed: Oct. 13, 1983

[30] Foreign Application Priority Data

Oct. 13, 1982 [JP] Japan ................................ 57-180469

[51] Int. Cl.$^4$ ........................... C08D 5/20; C08F 8/10
[52] U.S. Cl. ...................................... 521/28; 521/35; 521/39
[58] Field of Search ............................. 521/28, 35, 39

[56] References Cited
FOREIGN PATENT DOCUMENTS 5089285 12/1973 Japan ..................................... 521/35

Primary Examiner—Joseph L. Schofer
Assistant Examiner—Peter F. Kulkosky
Attorney, Agent, or Firm—Sughrue, Mion, Zinn, Macpeak and Seas

[57] ABSTRACT

A spherical ion exchange resin composed of a phenolic resin and a metal hydroxide is disclosed. The metal hydroxide is enclosed and bound with the phenolic resin. A method for producing such an ion exchange resin and a method for selectively adsorbing ions using the same is also disclosed. The ion exchange resin is capable of efficiently recovering ions contained or dissolved in water in trace amounts and, hence, can be applied to any aqueous solution containing ions. For example, it can be used to recover useful substances from sea water and to purify waste waters from nonferrous refineries and nuclear power plants.

15 Claims, No Drawings

SPHERICAL ION EXCHANGE RESIN HAVING MATRIX-BOUND METAL HYDROXIDE, METHOD FOR PRODUCING THE SAME AND METHOD FOR ADSORPTION TREATMENT USING THE SAME

FIELD OF THE INVENTION

The present invention relates to a spherical ion exchange resin and a method for producing the same. It also relates to a method for adsorption treatment using the same.

BACKGROUND OF THE INVENTION

Cation and anion exchange resins have been widely used to separate ions from a solution. However, hitherto known ion exchange resins could not be suitably used for separation of a particular cation or anion from a solution containing various kinds of cations and anions because of their weak selective adsorptivity.

As cation exchange resins capable of exhibiting selective adsorptivity, there have been used chelate resins composed of polymers introduced with chelate-forming groups, such as iminodiacetic and dithiocarbamic groups. Examples of such chelate resins include Dowex A-1 (trade name by Dow Chemical Ind.), Diaion CR-10 (trade name by Mitsubishi Chemical Ind.) and Unicellex UR-10 (trade name by Unitika Ltd.). Those chelate resins, however, exhibit selective adsorptivity to only divalent or more multivalent cations of, e.g., iron, copper, mercury, etc. They exhibit virtually no selectivity for monovalent cations of lithium, etc., divalent cations of alkaline earth metals, uranyl ion, and the like. On the other hand, no anion exchange resins have been put to practical use which are capable of selectively adsorbing a particular anion.

It is known that hydroxides of multivalent metals, such as titanium, iron, aluminium and zirconium, are capable of exchanging a particular anion or cation selectively. Taking advantage of this property, such hydroxides have been employed as effective ion exchangers. For example, selective adsorption properties of zirconium hydroxide to various anions and cations, in particular, to arsenite are described in Anal. Chem., 39, 2086 (1963). Selective adsorption properties of aluminium hydroxide to phosphate and arsenate ions are described in J. Radioanal. Chem., 4, 289 (1970). Commercial applications of such metal hydroxides, however, encounter the problem that they could hardly be applied to a column as they usually exist in the form of powder. In view of this, it has been proposed to use metal hydroxides shaped to spheric or microspheric forms. In one proposed method, powders of a metal hydroxide is admixed with a binder component, such as polyacrylonitriles, polyvinyl alcohols, polyacrylamides and polyacrylhydrazides, and then shaped to desired forms. For instance, J. Nacl. Sci. Tech., 14 (1), 811 describes shaped titanium hydroxide particles capable of selectively adsorbing uranium ions, in which a polyacrylamide is used as a binder. This kind of shaped products, however, have not been put to practical use due to various disadvantages. For example, they have only insufficient mechanical strengths and therefore do not withstand repeated uses. In another method so far proposed, a porous carrier, such as active carbon and organic polymers (e.g., MR type anion exchange resins of macro porous type) is dipped into an aqueous solution of a multivalent metal salt, removed out of the solution and then subjected to a treatment with an alkaline agent so as to deposit a metal hydroxide on the porous carrier. In U.S. Pat. No. 4,116,856, for instance, is described a process for adsorbing lithium ions selectively, using an adsorbent consisting of a MR type (macro porous type) anion exchange resin on which aluminium hydroxide is supported. However, adsorbents produced by the above method have not been put to practical use since they carry metal hydroxides only in amounts insufficient to attain a satisfactory ion exchange capacity.

It is therefore desired to develop unexpensive ion exchange resins capable of efficiently separating or removing metal ions contained, in particular, in water in trace amounts.

SUMMARY OF THE INVENTION

It is an object of the present invention to provide a spherical or microspherical ion exchange resin having a highly selective adsorptivity to a particular cation or anion.

It is another object of the present invention to provide a spherical or microspherical ion exchange resin which is stable both chemically and physically.

It is a further object of the invention to provide an economical method for producing a spherical or microspherical ion exchange resin.

It is a still further object of the invention to provide a method for adsorbing and separating an anion or cation from a solution by means of contact with a spherical or microspherical ion exchange resin.

The inventors have conducted extensive studies to achieve the above objectives and, as a result, have found that a spherical ion exchange resin composed of a phenolic resin and a metal hydroxide, the latter being enclosed and bound with the former is capable of separating or removing, efficiently and rapidly, a particular ion dissolved in a trace amount and, at the same time, can be used repeatedly without releasing the metal hydroxide out of the resin.

In accordance with the present invention, there are provided a spherical ion exchange resin comprising a phenolic resin and a metal hydroxide, the metal hydroxide is enclosed and bound with the phenolic resin; a method for producing a spherical ion exchange resin comprising a phenolic resin and a metal hydroxide, the metal hydroxide being enclosed and bound with the phenolic resin, wherein a phenol compound is subjected to precondensation with an aldehyde compound in the presence of an acid catalyst, a metal salt or oxide is incorporated into the reaction mixture while it still retains its fluidity, and the resulting mixture is dispersed into a medium and then subjected to polycondensation in a state of suspension until the reaction is completed, followed by a treatment with an alkaline agent; and a method of adsorption treatment comprising selectively adsorbing ions contained in a solution by the use of such an ion exchange resin.

The spherical ion exchange resin can be readily produced at low costs in accordance with the method of the invention. The spherical ion exchange resin produced by the method of the invention can be highly wear resistant and has little strains and cracks within resin particles. The resin, therefore, can withstand repeated uses without collapse of resin particles which might be caused by swelling or shrinkage.

DETAILED DESCRIPTION OF THE INVENTION

In contrast to known shaped ion exchange resins, the spherical ion exchange resins of the invention hardly release the metal hydroxide out of resin particles since it is enclosed and bound with a phenolic resin.

The production of the ion exchange resin of the invention may be carried out in accordance with the method described hereinbelow.

First, a phenolic resin is produced. A phenol compound may be precondensed with an aldehyde compound in the presence of an acid catalyst to give a phenolic resin. The precondensated phenolic resin preferably has a molecular weight of about 100 to about 800. Any phenol compound that contains a phenolic hydroxyl group may be used for the precondensation. Examples of usable phenol compounds include (i) phenol; (ii) substituted monohydric phenols, such as o-cresol, m-cresol, p-cresol, 2,3-xylenol, 2,5-xylenol, 3,5-xylenol, α-naphthol, β-naphthol, o-ethylphenol, m-ethylphenol, p-ethylphenol, p-hydroxyphenylalanine, tyrosine, oxine and p-phenolsulfonic acid; (iii) dihydric phenols, such as catechol, resorcin and Bisphenol A; and (iv) trihydric phenols, such as pyrogallol and chloroglucin. Of these phenol compounds, the phenol, p-hydroxyphenylalanine, tyrosine, oxine and p-phenolsulfonic acid are particularly preferable. These phenol compounds may be used individually, or two or more of these may be used in combination, preferably phenol alone or the combination of phenol and substituted monohydric phenol compound. Examples of usable aldehyde compounds include aldehyde derivatives, such as formaldehyde, paraformaldehyde and hexamethylenetetramine; fatty aldehydes, such as acetaldehyde and propionaldehyde; aromatic aldehydes, such as benzaldehyde, etc.; and heterocyclic aldehydes, such as furfural, etc. Of these aldehydes, the formaldehyde is particularly preferable. These compounds may be used individually, or two or more of these may be used at the same time. Examples of acid catalysts to be used for the precondensation reaction include mineral acids, such as hydrochloric acid and sulfuric acid; organic acids, such as formic acid and oxalic acid; and protonic acids, such as benzenesulfonic acid, etc. These acids may be used individually, or two or more of these may be used in combination. The precondensation reaction is preferably carried out at a temperature of from 20° to 70° C., preferably 30° to 60° C. with a molar ratio of aldehyde compounds to phenol compounds of from 1.0 to 3.0, preferably 1.5 to 2.5.

A metal salt or oxide is then incorporated into the reaction mixture while it still retains its fluidity. Any metal salt or oxide can be used provided it is capable of forming a water-insoluble hydroxide at a pH of 6 to 8. Examples of usable metal salts include hydrochlorides, oxychlorides, sulfates, nitrates and acetates of titanium, iron, aluminium, zirconium, tin, silver, zinc, mercury, bismuth, copper, antimony, tungsten and molybdenum, preferably hydrochlorides and sulfates. These metal salts or oxides may be used individually, or two or more of them may be used in combination. Preferably, such metal salts or oxides are used in an amount of from 0.5 to 200%, in particular, from 10 to 100% by weight of the total amount of phenol compounds used.

In the present invention, the polycondensation reaction of the resulting reaction mixture is completed in a state of suspension. As a medium used for the suspension polycondensation reaction, there may be used any medium provided it is inactive against the polycondensation reaction and capable of forming an azeotropic mixture with water. It is desirable from an operational point of view to use a non-inflammable or hardly inflammable medium which is not so miscible with water and has a relatively large specific gravity. Inexpensive mediums are advantageous. Examples of preferable mediums include halogenated hydrocarbons, such as carbon tetrachloride, chloroform, dichloromethane, trichloroethylene, 1,2-dichloroethane, 1-chloropentane, chlorobenzene, and the like. Halogenated ethers and saturated or unsaturated hydrocarbons may also be used. The suspension polycondensation reaction may be carried out at a temperature of from 70° to 150° C., preferably, from 90° to 130° C., more preferably 100° to 120° C. for a period of about 1 to 10 hours, preferably 2 to 6 hours, more preferably 3 to 5 hours. The reaction may be effected at reduced or elevated pressure, as well as at ordinary pressure. Upon the suspension polycondensation, there may also be used a dispersing agent as an aid to stabilize the suspension system.

After the suspension polycondensation reaction is completed as described above, resins are isolated from the reaction mixture and then treated with an alkaline agent. Examples of alkaline agents to be used for the treatment include sodium hydroxide, potassium hydroxide, sodium carbonate, aqueous ammonia, ammonium carbonate, and the like. The alkaline treatment is preferably carried out with a solution of the alkaline agent at room temperature, or at a temperature up to 80° C., more preferably 20° to 80° C., whereby the concentration of the alkaline agent is so adjusted that the solution would come to have a pH of about 4 to about 10 after the treatment.

In accordance with the method described above, the spherical ion exchange resin according to the invention can be readily produced at low costs. In addition, the spherical ion exchange resin produced by the method of the invention can be highly wear resistant and has little strains and cracks within resin particles. The resin, therefore, can withstand repeated uses without collapse of resin particles which might be caused by swelling or shrinkage.

The spherical ion exchange resin obtained by the present invention can be handled in the same manner as ordinary ion exchange resins and chelate resins. The resin can be used in accordance with a column or batchwise operation method to absorb or separate a particular ion contained or dissolved in a solution. The temperature of ion-containing solutions to be treated by the resin may be from 5° to 95° C., preferably from 15° to 50° C. Ion-containing solutions to be treated may be caused to contact with the resin for a period of from 1 minute to 50 hours, preferably from 10 minutes to 2 hours. Ions adsorbed on the ion exchange resin of the invention can be readily recovered through contact with an aqueous solution of mineral acids or an aqueous alkaline solution, as in the case of commercially available chelate or ion exchange resins. Upon regeneration, the ion exchange resin of the invention may be contacted with a solution containing a regenerating agent at a temperature of from 5° to 95° C., preferably from 15° to 50° C., for a period of from 1 minute to 50 hours, preferably from 10 minutes to 2 hours. The resin can be used many times repeatedly.

The present invention can be applied to both cations and anions. Examples of anions to which the invention can be applied include fluorine, arsenite, arsenate and phosphate ions. Examples of cations to which the invention can be applied include uranyl, lithium, caecium and strontium ions. Ion selectivity of the resin varies, depending on the kind of the metal oxide contained in the resin. It is therefore desired to select the kind of the metal hydroxide in accordance with the kind of ions to be adsorbed. As to the selection of metal hydroxides, reference may be made to Anal. Chem., 39, 1634 (1967); J. Radioanal. Chem., 16, 191 (1973) and Anal. Chem., 35, 2086 (1963), which contain detailed descriptions on the selectivity of metal hydroxides upon ion exchange. In general, the following combinations can be particularly effective: zirconium, aluminium and tin hydroxides for fluorine ion; iron, zirconium and titanium hydroxide for arsenite and arsenate ions; aluminium hydroxide for phosphate ion; titanium hydroxide for uranyl ion; aluminium and tin hydroxides for lithium ion; and titanium and zirconium hydroxides for caesium and strontium ions.

The ion exchange resin of the present invention is capable of efficiently recovering ions contained or dissolved in water in trace amounts, and can be applied to any kind of ion-containing aqueous solutions. For example, the resin can be used for recovering of useful substances from sea water and to purify various waste waters from nonferrous metal refineries and nuclear power plants.

The invention will further be illustrated by examples. However, the scope of the invention is not limited to these examples. In the examples all the parts and % are by weight.

EXAMPLE 1

A mixture of 16.7 parts of p-hydroxyphenylalanine, 18.8 parts of phenol, 37.5 parts of 37% formalin and 41.7 parts of 35% hydrochloric acid was stirred for 1 hour at 50° C. and cooled to room temperature. To this was added 37.5 parts of aqueous 30% titanium sulfate solution, and the resulting mixture was stirred for 30 minutes at room temperature to obtain the resin solution containing titanium sulfate. The reaction mixture was dispersed into a combined medium of carbon tetrachloride and monochlorobenzene (1:1 by vol.) in a 1 liter container and, while removing water, stirred for 3 hours at a temperature of 120° C. to effect suspension polycondensation. The thus formed resin was collected by filtration, air-dried and dipped into aqueous 5% NaOH solution at room temperature for a period of 1 hour. Thereafter, the resin was washed with water and dried. Spherical ion exchange resin of 20 to 50 mesh was obtained.

The resin had an arsenite ion adsorption capacity of 1.3 milliequivalents per gram of ion exchange resin, and a uranyl ion adsorption capacity of 1.2 milliequivalents per gram of ion exchange resin.

Into a column having an inner diameter of 1 cm was charged 50 cc of the resin obtained above, and 15 l of aqueous solution (pH=6) containing 3% of sodium chloride and 100 ppm (reduced to As) of arsenious acid was passed through the column at a rate of 250 cc/hr at 25° C.

At the end of this operation, the solution flowing out of the column contained only 0.1 ppm or less of As. Na was not adsorbed at all. These results show that the resin is capable of adsorbing As selectively.

The resin was then washed with water and eluted with 250 cc of 2N aqueous sodium hydroxide (NaOH) solution and 250 cc of water. The eluent contained As at a concentration of about 3000 ppm, that is, As adsorbed on the resin was eluted almost quantitatively.

The eluent contained titanium ions at a concentration of less than 0.1 ppm. This proves that titanium hydroxide was retained in the resin and did not dissolve into the eluent.

The above procedures were repeated 5 times. In each operation, only 0.1 ppm or less of As was detected in the solution flowing out of the column at the end of the operation where 15 l of As-containing solution was passed through the column. No deteriorations in the adsorption properties of the column were observed during the repetition of adsorptions and desorptions.

COMPARATIVE EXAMPLE 1

To 100 parts of titanium hydroxide slurry were added 50 parts of formalin and 30 parts of acrylamide. The resulting mixture was throughly stirred and added with 1 g of ammonium persulfate. After additional stirring, the reaction mixture was heated to 60° C. The solid product obtained was ground to 20 to 50 mesh and then treated with 0.5N of hydrochloric acid to give a polyacrylamide-titanium hydroxide ion exchange resin.

The thus obtained ion exchange resin had an arsenite ion adsorption capacity of 1.1 milliequivalents per gram of ion exchange resin.

The ion exchange resin was charged into a column identical with the one used in Example 1. An arsenious acid-containing solution identical with the one used in Example 1 was passed through the column under the same conditions as in Example 1.

When 3 l of the solution was passed through the column, the concentration of As contained in the effluent from the column rose to 1 ppm. This apparently shows that the resin has a very slow adsorption rate.

At this point in time, the flow of the solution was stopped, and 2N NaOH solution or eluant solution was passed through the column in a similar manner as in Example 1 to elute As adsorbed on the ion exchange resin.

The above procedures were repeated. During the third adsorption operation, the effluent from the column began to be contaminated with fine powders, which were generated probably through the collapse of the ion exchange resin. When the operations were further repeated, it became eventually impossible to pass solutions through the column.

COMPARATIVE EXAMPLE 2

A column similar to the one used in Example 1 was charged with 50 cc of a strongly basic anion exchange resin (Cl$^-$ type, 20-50 mesh) available on the market. An arsenic containing solution identical with the one used in Example 1 was passed through the column in a similar manner as in Example 1.

The concentration of As contained in the effluent from the column rose to 65 ppm at the time when 0.1 l of said solution was passed therethrough. It would therefore be apparent that the resin adsorbs virtually no arsenious ions.

EXAMPLE 2

A column identical with the one used in Example 1 was charged with 10 cc of the resin prepared in Example 1, and 500 l of sea water containing 3 $\mu$g/l of uranium was passed therethrough at a solvent velocity (SV) of 50 h$^{-1}$ at 25° C. Thereafter, 50 cc of 0.4M aqueous sodium hydrogencarbonate solution was passed through the column at a solvent velocity (SV) of 2 h$^{-1}$. The eluent contained uranium at a concentration of 16 ppm, that is, 53% of the uranium contained in the sea water was recovered selectively.

EXAMPLE 3

A hydrogen chloride solution containing a condensation product of p-hydroxyalanine, phenol and formalin was prepared in a similar manner as in Example 1. To this solution was added 40 parts of aqueous 20% zirconium oxychloride solution. The resulting mixture was stirred for 30 minutes at room temperature, and then subjected to a suspension polycondensation reaction and an alkali treatment in a similar manner as in Example 1 to give a spherical ion exchange resin of 20 to 40 mesh.

The ion exchanger had a fluorine ion adsorption capacity of 0.8 milliequivalents per gram of ion exchange resin.

Into a column having an inner diameter of 1 cm was charged 50 cc of the resin prepared above, and 20 l of an aqueous solution (pH=6) containing 3% of sodium chloride and 10 ppm (reduced to F) of sodium fluoride was passes therethrough at a rate of 250 cc/hr at 25° C.

At the end of this operation, only 0.1 ppm or less of F was contained in the solution flowing out of the column, which indicates that the resin is capable of adsorbing F selectively.

Thereafter, the resin was washed with water, and the fluorine ions adsorbed on the resin was eluted with 250 cc of 2N aqueous sodium hydroxide solution and 250 cc of water. The eluent contained fluorine ions at a concentration of 400 ppm. This shows that fluorine ions can be eluted almost quantitatively.

The above procedures were repeated 5 times. No deteriorations in the adsorption and desorption properties of the resin were observed.

EXAMPLE 4

A column identical with the one used in Example 1 was charged with 10 cc of the resin prepared in Example 3, and 2 l of a zinc refining solution containing 5.4 mg/l of F, 120 g/l of zinc and 180 g/l of sulfate ions was passed therethrough at a solvent velocity (SV) of 5 h$^{-1}$ at 40° C. After this treatment, the solution contained fluorine ions at a concentration of 0.8 ppm. In other words, fluorine ions contained in the zinc refining solution could be removed efficiently.

EXAMPLE 5

A mixture of 7.3 parts of oxine, 23.5 parts of phenol, 37.5 parts of 37% formalin and 41.7 parts of 35% hydrochloric acid was stirred for 2 hours at 50° C. and cooled to room temperature. To this solution was added 40 parts of 30% aluminium sulfate solution, and the resulting mixture was stirred for 30 minutes at room temperature. This was dispersed into a mixture of ethylene chloride and carbon tetrachloride in a 1 liter container and, while removing water, stirred for 5 hours at a temperature of 100° C. to effect suspension polycondensation. The thus formed resin was collected by filtration, air-dried and dipped into 5% aqueous ammonia at room temperature for a period of 1 hour to give a spherical ion exchange resin of 20 to 50 mesh.

The ion exchange resin had a lithium ion adsorption capacity of 0.5 milliequivalents per gram of ion exchange resin.

EXAMPLE 6

A hydrogen chloride solution containing a polycondensation product of oxine, phenol and formalin was prepared in the same manner as in Example 5. To this solution was added 40 parts of aqueous 30% ferric chloride solution. The resulting mixture was stirred for 30 minutes at room temperature, and then subjected to a suspension polycondensation reaction and an alkali treatment in a similar manner as in Example 3 to give a spherical ion exchange resin of 20 to 50 mesh.

The ion exchange resin had a phosphate ion adsorption capacity of 0.9 milliequivalents per gram of ion exchange resin.

EXAMPLE 7

A mixture of 49 parts of phenol, 60 parts of 37% formalin and 100 parts of sulfuric acid was stirred for 1 hour at 50° C. and cooled to room temperature. To this was added 80 parts of aqueous 30% zirconium oxychloride solution, and the resulting mixture was stirred for 30 minutes at room temperature to obtain the resin solution containing zirconium. The reaction mixture was dispersed into tetrachloroethylene (1:1 by vol.) and stirred for 3 hours at a temperature of 120° C. to effect suspension polycondensation. The thus formed resin was collected by filtration, air-dried and dipped into aqueous 5% NaOH solution at room temperature for a period of 2 hours. Thereafter, the resin was washed with water and dried. Spherical ion exchange resin of 20 to 50 mesh was obtained.

The resin had a fluorine ion adsorption capacity of 0.75 milliequivalents per gram of ion exchange resin.

While the invention has been described in detail and with reference to specific embodiments thereof, it will be apparent to one skilled in the art that various changes and modifications can be made therein without departing from the spirit and scope thereof.

What is claimed is:

1. A spherical ion exchange resin, comprising:
   a cross-linked phenolic resin; and
   a water insoluble multivalent metal hydroxide, wherein said metal hydroxide is enclosed and bound by a matrix of the cross-linked phenolic resin.

2. A method for producing a spherical ion exchange resin, comprising the steps of:
   subjecting a phenol compound to precondensation with an aldehyde compound in the presence of an acid catalyst to provide a reaction mixture;
   incorporating a compound selected from the group consisting of a multivalent metal salt or an oxide into the reaction mixture while the reaction mixture retains its fluidity;
   dispersing the mixture in a medium;
   subjecting the dispersed mixture to poly-condensation in a state of suspension until the reaction is completed;
   treating with an alkaline agent; and
   obtaining the spherical ion exchange resin comprised of the cross-linked phenolic resin and water insoluble multivalent metal hydroxide, wherein the water insoluble multivalent metal hydroxide is enclosed and bound by a matrix of the cross-linked phenolic resin.

3. A method of adsorption treatment, comprising the steps of:

mixing a spherical ion exchange resin comprised of a cross-linked phenolic resin and a water insoluble multivalent metal hydroxide, wherein the water insoluble multivalent metal hydroxide is enclosed and bound by a matrix of the cross-linked phenolic resin, with a solution containing ions; and allowing the ion exchange resin to selectively absorb ions from the solution.

4. A method for producing a spherical ion exchange resin as claimed in claim 2, wherein the phenol compound is at least one selected from the group consisting of phenol, p-hydroxyphenylalanine, tyrosine, oxine and p-phenolsulfonic acid.

5. A method for producing a spherical ion exchange resin as claimed in claim 2, wherein the aldehyde compound is formaldehyde.

6. A method for producing a spherical ion exchange resin as claimed in claim 2 wherein the phenolic resin is provided by carrying out precondensation of phenol with formaldehyde in the presence of an acid catalyst.

7. A method for producing a spherical ion exchange resin as claimed in claim 2, wherein the acid catalyst is at least one selected from the group consisting of mineral acids, organic acids and protonic acids.

8. A method for producing a spherical ion exchange resin as claimed in claim 2, wherein the precondensation reaction is carried out at a temperature in the range of 20° to 70° C. with a molar ratio of aldehyde compounds to phenol compounds of from 1.0 to 3.0.

9. A method for producing a spherical ion exchange resin as claimed in claim 2, wherein the compound selected from the group consisting of a multivalent metal salt and an oxide is incorporated into the reaction mixture in an amount of 0.5 to 200% by weight based on the total weight of the phenol compounds.

10. A method for producing a spherical ion exchange resin as claimed in claim 9, wherein the amount of the compound incorporated in the reaction mixture is in an amount in the range of 10 to 100% by weight based on the total weight of the phenol compounds.

11. A method for producing a spherical ion exchange resin as claimed in claim 2, wherein the polycondensation reaction is carried out in a state of suspension at a temperature in the range of 70° to 150° C. for a period of time of 1 to 10 hours.

12. A method for producing a spherical ion exchange resin as claimed in claim 2, wherein the treatment with the alkaline agent is carried out at a temperature in the range of 20° C. to 80° C. with an alkaline agent sufficient to adjust the pH within the range of about 4 to about 10 after completion of the treatment.

13. A method of adsorption treatment as claimed in claim 3, wherein the ion-containing solution has a temperature in the range of 5° C. to 95° C. and the treatment is carried out over a period of time of 1 minute to 50 hours.

14. A method of adsorption treatment as claimed in claim 13, wherein the solution has a temperature in the range of from 15° C. to 50° C.

15. A method of adsorption treatment as claimed in claim 13, wherein the treatment is carried out over a period of time of 10 minutes to 2 hours.

* * * * *